United States Patent
Vesterinen et al.

(10) Patent No.: US 7,657,734 B2
(45) Date of Patent: Feb. 2, 2010

(54) METHODS AND APPARATUS FOR AUTOMATICALLY MULTI-BOOTING A COMPUTER SYSTEM

(75) Inventors: Timo Vesterinen, Espoo (FI); Mauri Saksio, Espoo (FI); Sakari Molin, Järvenpää (FI)

(73) Assignee: Nokia Corporation, Espoo (FI)

( * ) Notice: Subject to any disclaimer, the term of this patent is extended or adjusted under 35 U.S.C. 154(b) by 459 days.

(21) Appl. No.: 11/508,802

(22) Filed: Aug. 22, 2006

(65) Prior Publication Data

US 2007/0101119 A1    May 3, 2007

(30) Foreign Application Priority Data

Nov. 3, 2005    (FI) .................................. 20051114

(51) Int. Cl.
*G06F 15/177* (2006.01)
(52) U.S. Cl. ............................. 713/2; 713/100; 714/23
(58) Field of Classification Search ................. 713/1, 713/2, 100; 714/2, 3, 23, 47
See application file for complete search history.

(56) References Cited

U.S. PATENT DOCUMENTS

| | | | |
|---|---|---|---|
| 6,446,203 B1 | 9/2002 | Aguilar et al. | 713/2 |
| 6,687,819 B1 | 2/2004 | Aguilar et al. | 713/2 |
| 7,506,152 B2 * | 3/2009 | Park et al. | 713/100 |
| 7,509,530 B2 * | 3/2009 | Welts | 714/15 |
| 2003/0051127 A1 | 3/2003 | Miwa | 713/2 |
| 2004/0003222 A1 | 1/2004 | Rich et al. | 713/1 |
| 2004/0111598 A1 | 6/2004 | Jordan et al. | 713/2 |
| 2004/0205755 A1 * | 10/2004 | Lescouet et al. | 718/100 |
| 2006/0101259 A1 * | 5/2006 | Chen | 713/2 |
| 2006/0133362 A1 * | 6/2006 | Stein et al. | 370/360 |

FOREIGN PATENT DOCUMENTS

| | | |
|---|---|---|
| EP | EP-1 460 536 A2 | 9/2004 |
| WO | WO-01/40946 A1 | 6/2001 |

OTHER PUBLICATIONS

Jaluna Osware, Architecture Overview JL/TR-05-03.2, 50 pages.
Jaluna Osware, Architecture Overview JL/TR-05-03.2, 50 pages, 2004.

* cited by examiner

*Primary Examiner*—Dennis M Butler
(74) *Attorney, Agent, or Firm*—Harrington & Smith, PC

(57) ABSTRACT

The invention allows automatically multi-booting a computer. Each functional mode of a computer having at least two operating systems installed is associated with one of the operating systems. Functional mode information identifying a particular functional mode of the computer is stored by a recovery system. While starting the computer, a boot loader receives the stored functional mode information, selects the operating system associated with the particular functional mode, and activates the selected operating system for the computer.

14 Claims, 3 Drawing Sheets

METHODS AND APPARATUS FOR AUTOMATICALLY MULTI-BOOTING A COMPUTER SYSTEM

CLAIM OF PRIORITY FROM A FOREIGN PATENT APPLICATION

Priority is herewith claimed under 35 U.S.C. §119(a) from Finnish Patent Application 20051114, entitled "Automatic Multi-Booting" and filed on Nov. 3, 2005 by Timo Vesterinen, Mauri Saksio and Sakari Molin. The disclosure of this Finnish Patent Application is hereby incorporated by reference in its entirety as if fully restated herein.

TECHNICAL FIELD

The invention relates to computer systems. In particular, the invention relates to automatically multi-booting a computer.

BACKGROUND

Computer systems, particularly large ones like telecommunication switching exchanges and telecommunication servers and various large network servers, typically comprise multiple computers, or computer units, linked to each other and running in parallel. FIG. 1 illustrates a typical prior art computer system 100 comprising computers 101-106 linked to each other with message bus 110.

These large computer systems often require high reliability. For example, downtime associated with a telecommunication switching exchange needs to be minimized in order to provide acceptable quality of service. A common way to implement high reliability by way of fault tolerance is to replicate at least some of the computers, computer processes and other elements of the computer system. In other words, e.g. a computer unit may be provided with a spare unit so that the computer unit and its spare unit constitute a pair wherein the spare unit is provided with input messages identical to the input messages the paired computer unit is provided with, and wherein the spare unit executes computations identical to the computations executed by the paired computer unit. However, output messages sent by the spare unit are discarded, resulting therefore in the spare unit effectively having no contribution to the operation of the computer system. Such a computer system is also known as a redundant computer system.

In the art, various functional modes are defined for indicating the contributory role of functions of a computer to the overall performance of a computer system at a given moment. In the art, such terms as "operational mode", "operational state" or "working state" are sometimes used instead of the term "functional mode".

Depending on whether a first computer unit is actively contributing to the operation of the computer system or whether the first computer unit has been assigned to function as a spare unit of a second computer unit, the first computer unit is considered to be in a functional mode of "working" or in a functional mode of "spare", respectively. That is, a computer in the functional mode of "working" is actively contributing to the operation of the computer system, e.g. in a direct fashion by controlling e.g. a hardware element (other than a hardware element in the computer itself), or in an indirect fashion wherein output (e.g. messages, file modifications) produced by the computer is forwarded e.g. to another computer in the computer system, to a hard drive in the computer system (outside the computer itself), or outside the computer system. In other words, the computer in the functional mode of "working" is connected to the rest of the computer system, and it is functioning normally, and it is contributing to the overall performance of the computer system.

On the other hand, a computer in the functional mode of "spare" receives input messages identical to the input messages sent to its paired computer, and the computer in the functional mode of "spare" executes computations identical to the computations executed by its paired computer, but output messages sent by the computer in the functional mode of "spare" are discarded, resulting therefore in the computer in the functional mode of "spare" effectively having no contribution to the operation of the computer system. In other words, the computer in the functional mode of "spare" is connected to the rest of the computer system, and it is functioning normally, but it is not contributing to the overall performance of the computer system.

As illustrated in FIG. 1, a large computer system, and particularly a redundant one, typically comprises a recovery system 120. The recovery system 120 provides various supervisory and diagnostic functions to facilitate recovering a failed computer. In addition, the recovery system controls—typically in a centralized manner—the functional modes of the computers of the computer system. In the art, such terms as "high availability system" or "supervision state management system" are sometimes used instead of the term "recovery system". Even though FIG. 1 depicts a singular recovery system 120, a recovery system is typically implemented by distributing it at least partly in the computer system. For example, a computer in the computer system may comprise low-level supervision software that supervises the status of the computer (for example, whether the operating system and application processes are functioning normally in the computer) and reports the status periodically to the main recovery system.

If a critical enough failure is detected while supervising the computer, the computer may need to be reset and restarted in a functional mode of "testing" in which various diagnostic tests are performed on the computer e.g. by diagnostic software of the recovery system in order to locate the cause of the failure. In other words, the computer in the functional mode of "testing" is not functioning normally and it is not contributing to the overall performance of the computer system, but it is still connected to the rest of the computer system.

If the cause of the failure is located, the computer is separated from the rest of the computer system to allow restoring or replacing it. In other words, the computer is now in a functional mode of "separated". Another reason for a computer being in the functional mode of "separated" is the computer being not yet installed in the computer system. Therefore, the computer in the functional mode of "separated" is not functioning normally and it is not contributing to the overall performance of the computer system, and it is not connected to the rest of the computer system.

The above-described change over from one functional mode to another is typically performed under the supervision of the recovery system. For example, in response to the above-described detection of the failure in the computer in the functional mode of "working", it is the recovery system that will step in and launch the change over from the functional mode of "working" to the functional mode of "testing" by restarting the computer. Typically, program modules for the operating system of the computer in question were loaded—under the supervision of the recovery system—into the memory of the computer while the computer was initially powered up. Therefore, while restarting the computer, the operating system is typically not reloaded in order to speed up changing the functional mode.

The above described large computer systems have typically evolved over a long period of time. As a result, many such computer systems traditionally utilize proprietary operating systems as opposed to commercially available operating systems, such as Linux and UNIX. For example, a family of DX 200 telecommunication switching exchanges developed by the present assignee utilizes a proprietary operating system known as DMX.

Yet, a recent trend is that of implementing new services on servers utilizing commercially available operating systems, such as Linux and UNIX. Furthermore, many standardizing forums are defining interfaces for applications and solutions for common system functions for these commercially available operating systems. The number of protocol and interface related software for commercially available operating systems is increasing rapidly.

Since the already existing large legacy computer systems typically have a huge amount of software, it is not realistically possible to redesign or replace this already existing software with new software. This leaves the option of trying to find solutions that allow running proprietary legacy software in parallel with new commercially available software. This is illustrated in FIG. 1 with computer 105 running commercially available software on Linux operating system and with computers 101, 102, 103, 104, and 106 running proprietary legacy software on DMX operating system.

Yet, there are situations in which both proprietary legacy software and new commercially available software need to be run on the same computer. For example, the above-described supervisory and diagnostic software is typically only available as proprietary software, wherein application software run in the computer may only be available as commercial software. As a result, such a computer needs to have both a corresponding proprietary operating system and a corresponding commercially available operating system installed in it allowing running the application software on the commercially available operating system and the supervisory and diagnostic software on the proprietary operating system.

As a result, multiple operating systems need to co-exist on a single computer. Prior art includes some solutions for this. For example, a dual-boot feature is known in which e.g. two operating systems are installed on a single computer, and during start-up a user is allowed to manually select which operating system to start. However, this solution has the drawback of requiring manual input from a user thus making it cumbersome to use. Furthermore, this solution has the drawback of loading the selected operating system from disk or other mass-storage media thus slowing down the loading of the selected operating system.

Prior art further includes splitting a computer into two virtual machines, which use different operating systems. An example of such a solution is a nanokernel product called OSware by Jaluna corporation (see http://www.jaluna.com). However, this solution has the drawback of complexity: the nanokernel shares the computer and its resources for two virtual machines, switching between the partitions of each operating system takes time, and communication between the two virtual machines requires extra modifications.

Therefore, the object of the present invention is to alleviate the problems described above and to introduce a solution that allows starting an operating system out of multiple operating systems automatically, i.e. without requiring input from a human user.

SUMMARY OF THE PREFERRED EMBODIMENTS

A first aspect of the present invention is an automatically multi-bootable computer system. The automatically multi-bootable computer system comprises a computer. The computer has at least two operating systems installed. Furthermore, while functioning, the computer is in one out of multiple functional modes. Each of the multiple functional modes of the computer is associated with one of the at least two operating systems, and each of at least two of the multiple functional modes is associated with different ones of the at least two operating systems.

The automatically multi-bootable computer system further comprises a computer state manager configured to store functional mode information. The functional mode information identifies a particular functional mode of the computer. It is to be understood that the term "particular" is herein used to indicate "a particular functional mode the computer will assume at the time of starting the computer." That is, the particular functional mode of the computer is the functional mode the computer needs to be started into.

The automatically multi-bootable computer system further comprises a boot loader configured to receive the stored functional mode information from the computer state manager, while starting up the computer. While still starting up the computer, the boot loader is further configured to select the one of the at least two operating systems that is associated with the particular functional mode of the computer, wherein the particular functional mode is identified by the received functional mode information. While still starting up the computer, the boot loader is further configured to activate the selected operating system for the computer. It is to be understood that the term "starting" the computer is herein used to refer to both powering up the computer and restarting the computer.

A second aspect of the present invention is a computer-readable memory medium storing a boot loader for automatically multi-booting a computer system. The computer system comprises a computer having at least two operating systems installed. The boot loader performs operations when executed, the operations comprising: receiving functional mode information, wherein the functional mode information identifies a particular functional mode the computer will enter when the computer is re-started for a pre-determined reason, the particular functional mode corresponding to one of multiple functional modes the computer may enter, each of the multiple functional modes associated with one of the at least two operating systems, and each of at least two of the multiple functional modes associated with different ones of the at least two operating systems; and activating the operating system associated with the particular functional mode when re-starting the computer.

A third aspect of the present invention is a method of automatically multi-booting a computer system comprising a computer, the computer having at least two operating systems installed. The method comprises associating each of multiple functional modes of the computer with one of the at least two operating systems, each of at least two of the multiple functional modes being associated with different ones of the at least two operating systems.

The method further comprises storing functional mode information identifying a particular functional mode the computer will assume when the computer is next started. In response to starting the computer, the method further comprises receiving the stored functional mode information; selecting the one of the at least two operating systems associated with the particular functional mode of the computer indicated by the received functional mode information; and activating the selected operating system for the computer.

A fourth aspect of the present invention is a computer-readable memory medium storing a computer program, the computer program for automatically multi-booting a computer system comprising a computer, the computer having at least two operating systems installed. When the computer program is executed by digital processing apparatus operations are performed, the operations comprising: associating each of multiple functional modes of the computer system with one of the at least two operating systems, each of at least two of the multiple functional modes being associated with different ones of the at least two operating systems; storing functional mode information identifying a particular functional mode of the computer; and in response to starting up the computer, receiving the stored mode information; selecting the one of the at least two operating systems associated with the particular functional mode of the computer indicated by the received mode information; and activating the selected operating system for the computer.

A fifth aspect of the present invention is an automatically multi-bootable computer system. The automatically multi-bootable computer system of the fifth aspect of the present invention comprises a computer having at least two operating systems installed. When operating, the computer is in one out of multiple functional modes, each of the multiple functional modes being associated with one of the at least two operating systems, and each of at least two of the multiple functional modes being associated with different ones of the at least two operating systems.

The automatically multi-bootable computer system of the fifth aspect of the present invention further comprises a recovery means for storing functional mode information identifying a particular functional mode of the computer, wherein when the computer is started the computer assumes the particular functional mode.

The automatically multi-bootable computer system of the fifth aspect of the present invention further comprises a boot loading means for receiving the stored functional mode information, for selecting the one of the at least two operating systems associated with the particular functional mode of the computer indicated by the received functional mode information, and for activating the selected operating system for the computer, while starting the computer.

In an embodiment of the invention, the boot loader is further configured to load each of the at least two operating systems into memory, while powering up the computer.

In an embodiment of the invention, the boot loader is further configured to automatically suspend each non-selected operating system for the computer, while starting the computer.

In an embodiment of the invention, the automatically multi-bootable computer system further comprises at least one additional computer. The at least one additional computer may comprise multiple operating systems and the boot loader of the present invention. Alternatively, the at least one additional computer may be a conventional computer.

The invention allows starting one operating system out of multiple operating systems automatically, i.e. without requiring input from a human user. Furthermore, the invention allows loading each operating system into memory while powering up the computer so that the selected operating system need not be loaded from disk or other mass-storage media during each restart. Thus, the invention speeds up restarts. Furthermore, the invention does not require extensive hardware or software modifications. Nor does the invention require extensive amounts of resources. As a result, the invention allows utilizing both new commercially available software and proprietary legacy software on a single computer.

In conclusion, the foregoing summary of aspects and embodiments of the present invention is exemplary and non-limiting. For example, one skilled in the art will understand that one or more aspects or steps from one embodiment can be combined with one or more aspects or steps from another embodiment of the present invention to create a new embodiment within the scope of the present invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
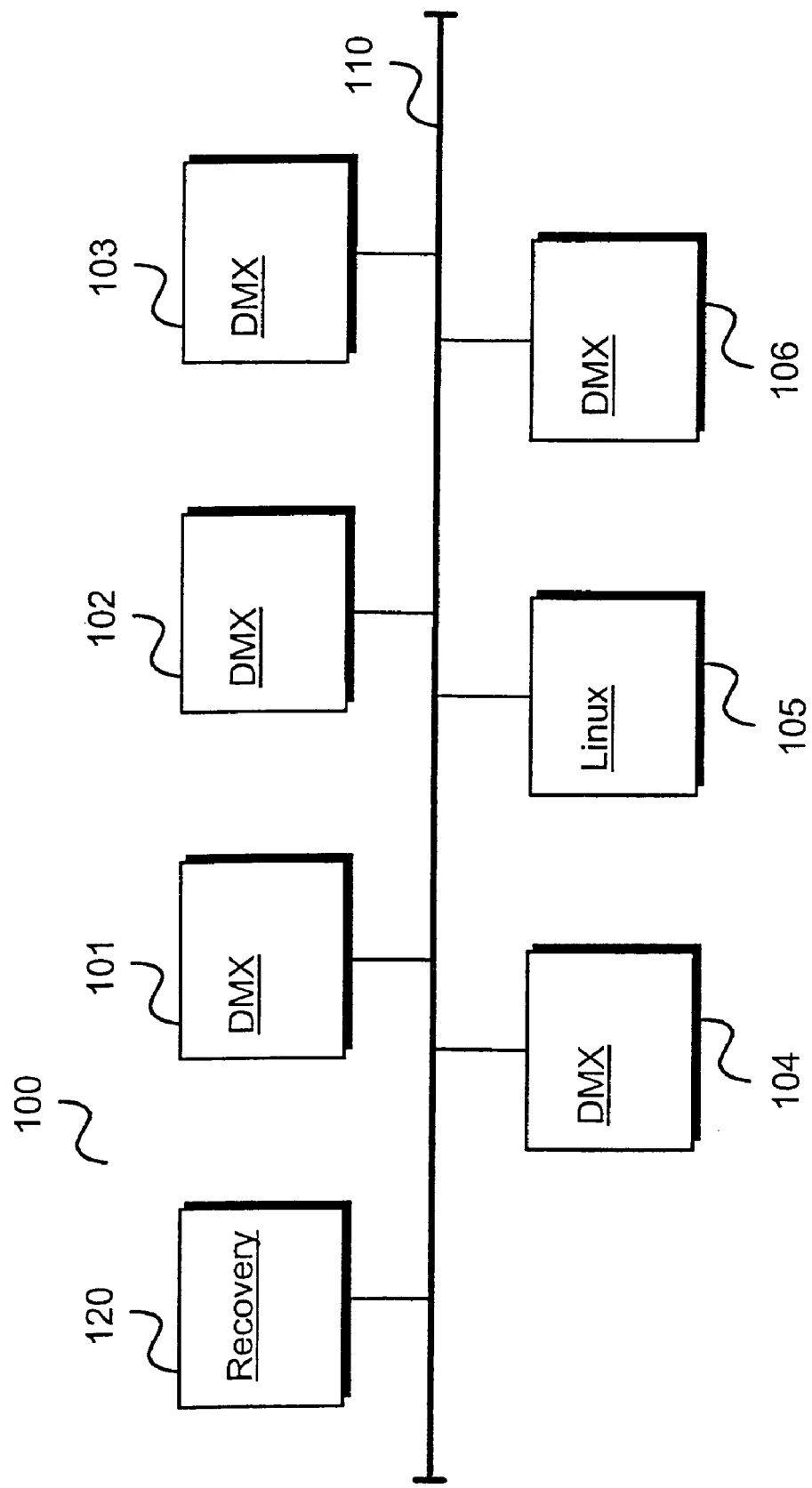
FIG. 1 is a block diagram illustrating a prior art computer system.
Figure 2:
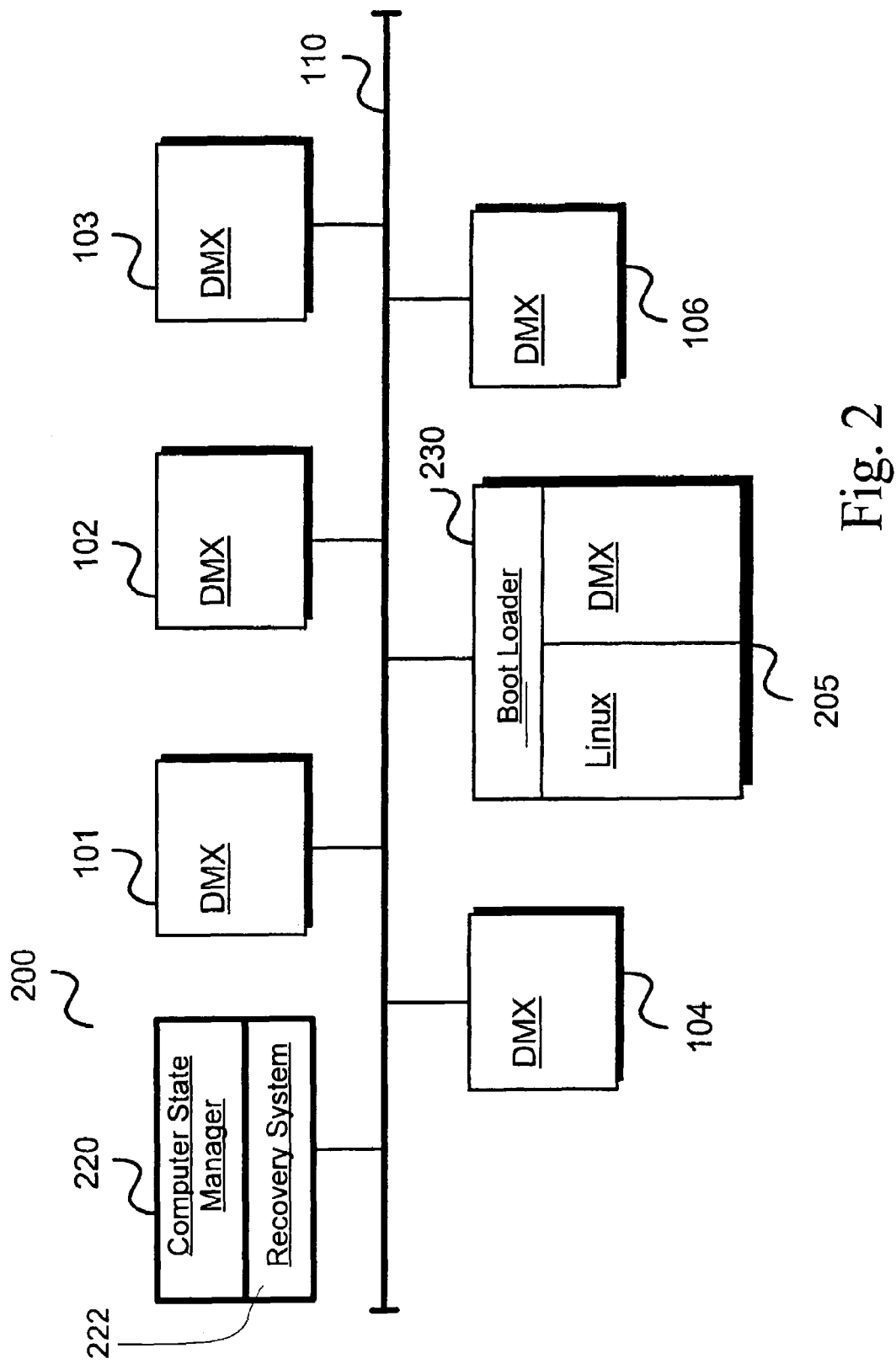
FIG. 2 is a block diagram illustrating an automatically multi-bootable computer system according to an embodiment of the present invention.

FIG. 2 illustrates a computer system 200 according to an embodiment of the present invention. The computer system 200 may be e.g. a telecommunication switching exchange. The computer system 200 comprises a number of conventional computers 101, 102, 103, 104 and 106 with one operating system, which is DMX in the embodiment of FIG. 2. In addition, the computer system 200 comprises a computer 205 with two operating systems installed, which are DMX and Linux in the embodiment of FIG. 2. The computers 101, 102, 103, 104, 106 and 205 are connected to each other with a link, which is message bus 110 in the embodiment of FIG. 2. As is obvious to a person skilled in the art, other suitable linking means may be utilized in place of the message bus 110. Each of the computers 101, 102, 103, 104, 106 and 205 comprises at least a processor, memory storage means such as random access memory or read only memory, and application software (not illustrated in FIG. 2). In addition, at least one of the computers 101, 102, 103, 104, 106 and 205 may comprise mass-storage media (not illustrated in FIG. 2), such as a hard drive or an optical drive.

While functioning, each of the computers 101, 102, 103, 104, 106 and 205 is in one out of multiple functional modes. In the embodiment of FIG. 2, these multiple functional modes are, for example, "working", "spare", "testing" and "separated." In accordance with the invention, at least in the computer 205 with multiple operating systems, each of the multiple functional modes is associated with one of the operating systems. For example, in the embodiment of FIG. 2, the functional mode of "working" is associated with the Linux operating system, and the functional mode of "testing" is associated with the DMX operating system. Obviously, there may be more than one computer with multiple operating systems in a computer system. In such a case, the association between operating system and functional modes may be computer-specific allowing e.g. the functional mode of "working" to be associated with e.g. the Linux operating system in one computer and e.g. with a UNIX operating system in another computer.

The computer system 200 further comprises a recovery system 222 configured to store functional mode information indicating a particular functional mode of the computer 205 with multiple operating systems. It is to be understood that the term "particular functional mode" is herein used to refer to "a particular functional mode the computer 205 assumes when the computer 205 is started." That is, the particular functional mode of the computer 205 is the functional mode that the computer 205 will assume when it is started. Furthermore, it is to be understood that the term "starting" the computer 205 is herein used to refer to both powering up the computer 205 and restarting the computer 205 subsequently. In addition to storing the functional mode information, the recovery system 222 may be configured to perform the above-described prior art supervisory and diagnostic functions for facilitating recovery of a failed computer. Even though FIG. 2 depicts a singular recovery system 222 for the sake of clarity, the recovery system 222 may be implemented by distributing it at least partly in the computer system 200.

Although system 222 is referred to as a recovery system, in more general applications recovery system 222 may comprise an element of a computer state manager 220. Such a computer state manager 220 would be particularly useful where the computer 205 has many functional modes (not necessarily associated with fault recovery) and many operating systems installed. In such an embodiment, computer state manager 220 would be primarily concerned with insuring that the proper operating system is selected when entering a particular functional mode so that productivity operations may be performed, although in such an embodiment fault recovery operations may also be performed using the teachings of the invention.

The computer system 200 further comprises a boot loader 230 configured to receive the stored functional mode information from the recovery system 222, while starting the computer 205 with multiple operating systems. While still starting the computer 205, the boot loader 230 is further configured to select the one of the operating systems DMX and Linux that is associated with the particular functional mode of the computer wherein the particular functional mode is identified by the received mode information. Therefore, to continue the above example, if the computer 205 will assume the particular functional mode of "testing" when it is started, the operating system DMX associated with this particular functional mode will be selected. Correspondingly, if the computer 205 will assume the particular functional mode of "working" when it is started, the operating system Linux associated with this particular functional mode is selected. While in the process of starting the computer 205, boot loader 230 is further configured to activate the selected operating system for the computer 205. In the embodiment of FIG. 2, the boot loader 230 is disposed in the same computer 205 in which it is utilized. As is obvious to a person skilled in the art, the rest of the computers 101, 102, 103, 104 and 106 may utilize conventional boot loaders (not illustrated in FIG. 2) that simply load their respective single operating system. Examples of such conventional boot loaders include BIOS and OS Loader, as well as Bolero which is typically used in e.g. DX 200 telecommunication switching exchanges developed by the present assignee.

In the embodiment of FIG. 2, the boot loader 230 may be further configured to load each of the operating systems into memory, while starting the computer 205. Furthermore, in the embodiment of FIG. 2, the boot loader 230 may be further configured to automatically suspend each non-selected operating system for the computer 205, while starting the computer.

In an embodiment, after power is applied to the computer 205, the boot loader 230—which may be implemented e.g. as flash code in the computer 205—starts to execute. First, it contacts a supervisory element of the recovery system 222 requesting permission to load program modules for each relevant operating system—Linux and DMX in the embodiment of FIG. 2—and for each relevant application. The boot loader 230 receives the permission and loads the program modules into the memory of the computer 205. The loading of the program modules having been completed, the computer 205 then enters the particular functional mode of "working" and the associated operating system—Linux in the embodiment of FIG. 2—is started.

After a while, the computer 205 fails a self-test and therefore executes a hardware reset. Alternatively, the computer 205 may e.g. receive a request from the recovery system 222 to reset itself. In response to the reset, the boot loader 230 starts to execute contacting the supervisory element of the recovery system 222 and requesting permission to perform a fast restart to allow utilizing the program modules previously loaded into the memory of the computer 205 when the computer 205 was powered up. Assuming the reset was due to the computer 205 failing the self-test, the computer 205 is now to be restarted in the functional mode of "testing" which is associated with the DMX operating system in the embodiment of FIG. 2. Therefore, the program modules related to the Linux operating system are suspended, and the program modules related to the DMX operating system are activated. In other words, the computer 205 enters the particular functional mode of "testing" and the associated operating system—DMX in the embodiment of FIG. 2—is started. Diagnostics are performed with DMX software to locate the cause of the failure. After completing the diagnostics, the executing DMX operating system performs reset, and the boot loader 230 starts again. Assuming no hard failure was detected in the diagnostics, the recovery system 222 permits the computer 205 to enter the particular functional mode "working" and to start the associated operating system—Linux in the embodiment of FIG. 2—again.

As described above, the boot loader 230 may utilize the program modules already loaded into the memory of the computer 205. However, a new set of program modules may alternatively be loaded from a disk, some other media or some other computer, e.g. if required program modules have not been previously loaded into the memory of the computer 205.

Figure 3:
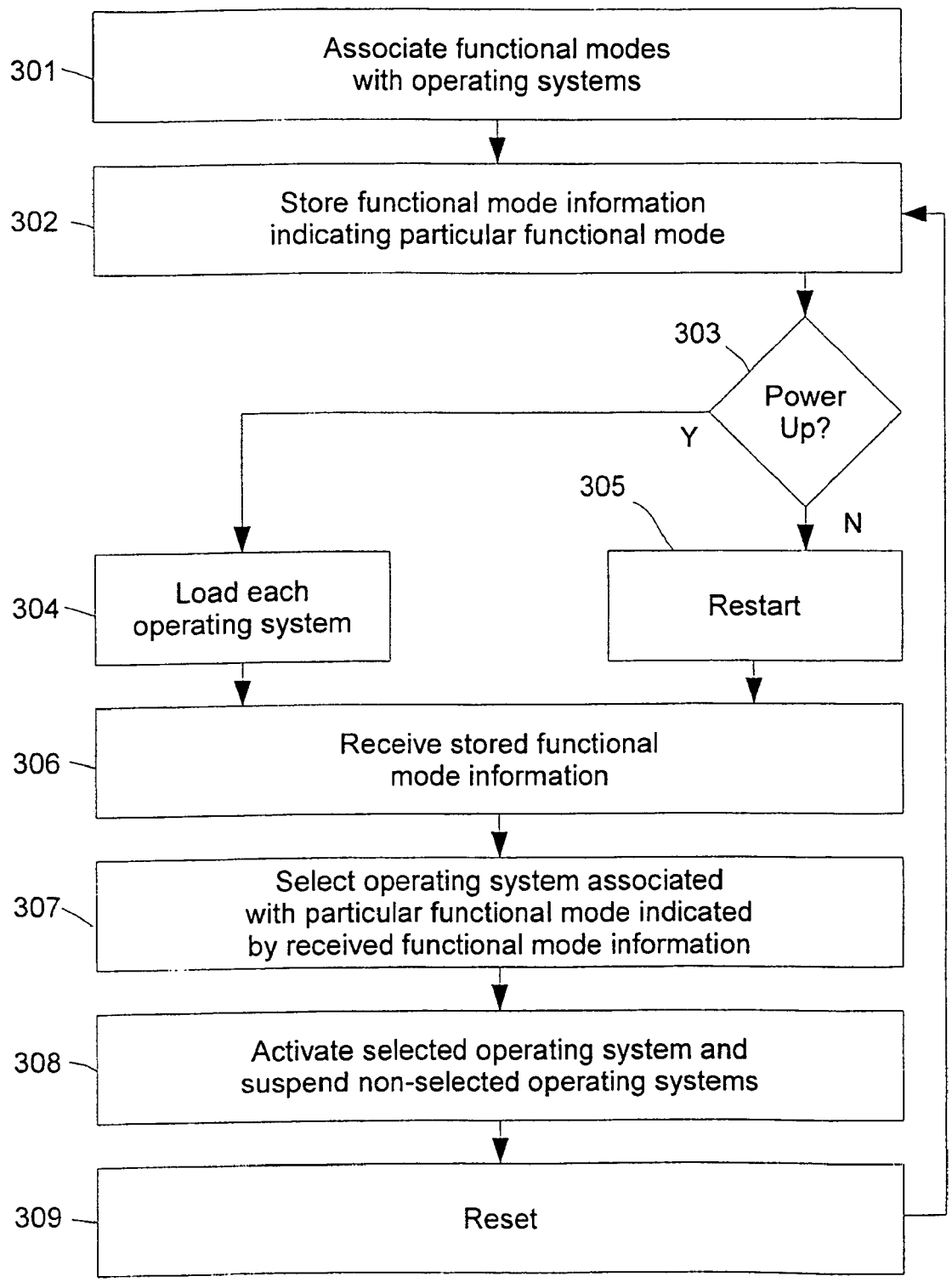
FIG. 3 is a flow diagram illustrating a method according to an embodiment of the present invention.

FIG. 3 illustrates an embodiment of the method of the present invention relating to automatic multi-booting. At first step 301, each of the multiple functional modes of a computer having at least two operating systems installed is associated with one of the at least two operating systems, wherein each of at least two of the multiple functional modes is associated with different ones of the at least two operating systems. This association may be performed by e.g. a recovery system supervising the computer, such as the recovery system 222 of FIG. 2.

Next, at step 302, functional mode information identifying a particular functional mode of the computer is stored. Again, a recovery system supervising the computer, such as the recovery system 222 of FIG. 2, may be utilized to store the functional mode information. As noted above, the term "particular functional mode" is herein used to refer to "the particular functional mode the computer will enter when it is started", i.e. the particular functional mode of the computer is the functional mode that the computer enters when the computer is started. Therefore, initially—that is, while installing the computer into the computer system—the recovery system typically stores mode information, which indicates that the functional mode of "working" is to be the particular functional mode of the computer, since the functional mode of "working" is the mode in which the computer will normally operate after being powered up. Then, during subsequent start-ups the particular functional mode of the computer may change as needed.

At step 303, it is determined whether the computer is to be powered up. If the computer is to be powered up, the method proceeds to step 304 in which each of the at least two operating systems is loaded into memory of the computer. If the computer has already been powered up previously, it is determined that the present starting up of the computer is a case of restart, step 305. In this case there is no need to load the operating systems into memory since they have already been loaded when the computer was previously powered up.

Next, at step 306, the stored functional mode information is received at the computer. At step 307, the one of the at least two operating systems associated with the particular functional mode of the computer identified by the received mode information is selected. Then, at step 308, the selected operating system is activated for the computer. Also, the non-selected operating system or systems—loaded into memory at step 304 while powering up the computer—are suspended at step 308.

Next, the computer will typically continue to operate in a normal fashion for a while. However, at step 309, a change over to a new functional mode is triggered. For example, a failure may be detected in the computer resulting in a need to change the computer over from the functional mode of "working" to the functional mode of "testing" in order to perform diagnostic tests on the computer. Such a failure may be e.g., associated with corruption in the loaded program code of the currently active operating system, or corruption in the loaded program code of the currently active application software running on top of the currently active operating system. As a result, at step 309 the computer is reset to allow loading the operating system associated with the new functional mode.

In response to the reset, the method of FIG. 3 goes back to step 302 wherein new functional mode information indicating the particular functional mode of the computer is again stored. Obviously, any previously stored functional mode information will be replaced by the newly stored functional mode information when the method returns to step 302. As before, the term "particular" is again used to indicate "particular at the time of starting up the computer", i.e. the particular functional mode of the computer is the functional mode the computer will enter when it is started. Therefore, in the above example of the reset of step 309 due to the detection of the failure in the computer in the functional mode of "working" and the resulting need to change over to the functional mode of "testing", the new mode information to be stored at step 302 will indicate that the functional mode of "testing" is to be the particular functional mode of the computer. Again, the recovery system 222 of FIG. 2 may be utilized to store the functional mode information. Incidentally, it is to be understood that while in the embodiment of the present invention of FIG. 3 the above storing of the new mode information at step 302 in connection with restarting the computer is—for the sake of clarity—illustrated as being performed after the reset of step 309, the storing of the new mode information may as well be performed at the same or before the reset of step 309, as is obvious to those skilled in the art.

Next, the method will again loop through steps 303 to 308 in order to restart the computer in the operating system associated with the functional mode of "testing". As the computer will be restarted this time rather than powered up, step 305 will be taken instead of step 304.

It is obvious to a person skilled in the art that with the advancement of technology, the basic idea of the invention may be implemented in various ways. The invention and its embodiments are thus not limited to the examples described above, instead they may vary within the scope of the claims.

Thus it is seen that the foregoing description has provided by way of exemplary and non-limiting examples a full and informative description of the best methods and apparatus presently contemplated by the inventors for automatically multi-booting a computer. One skilled in the art will appreciate that the various embodiments described herein can be practiced individually; in combination with one or more other embodiments described herein; or in combination with computer systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. An automatically multi-bootable computer system comprising:
   a computer having at least two operating systems installed, the computer being in one out of multiple functional modes, each of the multiple functional modes associated with one of the at least two operating systems, and each of at least two of the multiple functional modes associated with different ones of the at least two operating systems;
   a computer state manager configured to store functional mode information, wherein the functional mode information identifies a particular functional mode the computer will assume when the computer is re-started for a pre-determined reason; and
   a boot loader configured to receive the stored functional mode information and to activate the operating system associated with the particular functional mode identified by the functional mode information when re-starting the computer for the pre-determined reason;
   wherein the computer state manager comprises a recovery system for recovering the computer from a fault condition; the pre-determined reason for re-starting the computer comprises an occurrence of a fault condition; and the particular functional mode comprises a fault recovery functional mode.

2. The automatically multi-bootable computer system of claim 1 wherein the pre-determined reason for re-starting the computer comprises a need to use software supported by the operating system associated with the particular functional mode identified by the functional mode information.

3. The automatically multi-bootable computer system of claim 2 wherein the particular functional mode comprises a legacy software functional mode, wherein when in the legacy software functional mode the computer system executes legacy software.

4. The automatically multi-bootable computer system of claim 2 wherein the particular functional mode comprises a diagnostic functional mode, wherein when in the diagnostic functional mode the computer system executes diagnostic operations.

5. The automatically multi-bootable computer system of claim 2 wherein the particular functional mode comprises a maintenance functional mode, wherein when in the maintenance functional mode maintenance operations are performed.

6. The automatically multi-bootable computer system of claim 1 wherein the computer is re-started into the particular functional mode after an intervening period when the computer is de-activated.

7. The automatically multi-bootable computer system of claim 1 wherein the computer is re-started into the particular functional mode after an intervening period when the computer is in a stand-by mode.

8. The automatically multi-bootable computer system of claim 1, wherein the boot loader is further configured to load each of the at least two operating systems into memory, while powering up the computer.

9. The automatically multi-bootable computer system of claim 8, wherein the boot loader is further configured to automatically suspend each non-selected operating system for the computer, when re-starting the computer.

10. The automatically multi-bootable computer system of claim 1, further comprising at least one additional computer.

11. A memory medium storing a boot loader executable by a digital processing apparatus, the boot loader for automatically multi-booting a computer system, the computer system comprising a computer having at least two operating systems installed, the boot loader performing operations when executed, the operations comprising:
receiving functional mode information, wherein the functional mode information identifies a particular functional mode the computer will enter when the computer is re-started for a pre-determined reason, the particular functional mode corresponding to one of multiple functional modes the computer may enter, each of the multiple functional modes associated with one of the at least two operating systems, and each of at least two of the multiple functional modes associated with different ones of the at least two operating systems; and
activating the operating system associated with the particular functional mode when re-starting the computer;
wherein the pre-determined reason for re-starting the computer comprises an occurrence of a fault condition and the particular functional mode comprises a fault recovery functional mode.

12. A method of automatically multi-booting a computer system comprising a computer, wherein the computer has at least two operating systems installed, the method comprising:
associating each of multiple functional modes of the computer with one of the at least two operating systems, each of at least two of the multiple functional modes being associated with different ones of the at least two operating systems;
storing functional mode information indicating a particular functional mode the computer will assume when the computer is next started; and
in response to re-starting the computer for a pre-determined reason:
receiving the stored functional mode information;
selecting the one of the at least two operating systems associated with the particular functional mode of the computer indicated by the received mode information; and
activating the selected operating system for the computer;
wherein the pre-determined reason for re-starting the computer comprises an occurrence of a fault condition and the particular functional mode comprises a fault recovery functional mode.

13. A computer-readable memory medium storing a computer program, the computer program for automatically multi-booting a computer system, wherein the computer system comprises a computer having at least two operating systems installed, the computer program executable by a digital processing apparatus, wherein when the computer program is executed operations are performed, the operations comprising:
associating each of multiple functional modes of the computer with one of the at least two operating systems, each of at least two of the multiple functional modes being associated with different ones of the at least two operating systems;
storing functional mode information indicating a particular functional mode of the computer; and
in response to re-starting up the computer for a pre-determined reason:
receiving the stored functional mode information;
selecting the one of the at least two operating systems associated with the particular functional mode of the computer indicated by the received functional mode information; and
activating the selected operating system for the computer;
wherein the pre-determined reason for re-starting the computer comprises an occurrence of a fault condition and the particular functional mode comprises a fault recovery functional mode.

14. An automatically multi-bootable computer system comprising:
a computer having at least two operating systems installed, the computer being in one out of multiple functional modes, each of the multiple functional modes associated with one of the at least two operating systems, and each of at least two of the multiple functional modes being associated with different ones of the at least two operating systems;
a recovery means for storing mode information identifying a particular functional mode of the computer, wherein when the computer is re-started for a pre-determined reason the computer assumes the particular functional mode; and
a boot loading means for receiving the stored mode information, for selecting the one of the at least two operating systems associated with the particular functional mode of the computer indicated by the received mode information, and for activating the selected operating system for the computer, while re-starting the computer for the pre-determined reason;
wherein the recovery means comprises a recovery system for recovering the computer from a fault condition: the pre-determined reason for re-starting the computer comprises an occurrence of a fault condition; and the particular functional mode comprises a fault recovery functional mode.

* * * * *